United States Patent
Wang et al.

(10) Patent No.: US 8,171,720 B2
(45) Date of Patent: May 8, 2012

(54) SYSTEM AND METHODS TO DETECT NON-UREA REDUCTANT FILLED IN A UREA TANK

(75) Inventors: Yue-Yun Wang, Troy, MI (US); Ognyan N. Yanakiev, Canton, MI (US); Man-Feng Chang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 869 days.

(21) Appl. No.: 12/245,830

(22) Filed: Oct. 6, 2008

(65) Prior Publication Data

US 2010/0083636 A1 Apr. 8, 2010

(51) Int. Cl.
*F01N 3/00* (2006.01)
(52) U.S. Cl. .................. 60/277; 60/286; 60/295; 60/274
(58) Field of Classification Search ............. 60/272–324
See application file for complete search history.

(56) References Cited

U.S. PATENT DOCUMENTS

| | | | |
|---|---|---|---|
| 2005/0103000 A1* | 5/2005 | Nieuwstadt et al. | 60/286 |
| 2006/0218895 A1* | 10/2006 | Wickert | 60/277 |
| 2006/0242945 A1* | 11/2006 | Wang et al. | 60/277 |
| 2008/0178575 A1* | 7/2008 | Shaikh et al. | 60/274 |
| 2009/0293451 A1* | 12/2009 | Kesse | 60/274 |
| 2010/0205940 A1* | 8/2010 | Toshioka et al. | 60/276 |

* cited by examiner

*Primary Examiner* — Kenneth Bomberg
*Assistant Examiner* — Anthony Ayala Delgado (57) ABSTRACT

A method for indicating a non-urea reductant fault in a powertrain including an internal combustion engine and an aftertreatment system having an aftertreatment device utilizing a catalyst to convert NOx includes monitoring a NOx content exiting the aftertreatment system subsequent to a powertrain start-up event through a test span, monitoring a measure of NOx content entering the aftertreatment system subsequent to a powertrain start-up event through the test span, and determining a measure of NOx conversion accomplished in the aftertreatment device based upon the NOx content exiting the aftertreatment system and the measure of NOx content entering the aftertreatment system. The method includes, through the test span, comparing the measure of NOx conversion determined at a start of the test span to the measure of NOx conversion at a later time within the test span. A non-urea reductant fault is indicated based upon the comparing identifying a reduction in NOx conversion accomplished in the aftertreatment device between the start of the test span and the later time within the test span.

22 Claims, 7 Drawing Sheets

SYSTEM AND METHODS TO DETECT NON-UREA REDUCTANT FILLED IN A UREA TANK

TECHNICAL FIELD

This disclosure is related to control of aftertreatment of NOx emissions in internal combustion engines.

BACKGROUND

The statements in this section merely provide background information related to the present disclosure and may not constitute prior art.

Emissions control is an important factor in engine design and engine control. One particular combustion by-product, NOx, is created by nitrogen and oxygen molecules present in engine intake air disassociating in the high temperatures of combustion. Rates of NOx creation include known relationships to the combustion process, for example, with higher rates of NOx creation being associated with higher combustion temperatures and longer exposure of air molecules to the higher temperatures. Reduction of NOx created in the combustion process and management of NOx in an exhaust aftertreatment system are priorities in vehicle design.

NOx molecules, once created in the combustion chamber, can be converted back into nitrogen and oxygen molecules in exemplary devices known in the art within the broader category of aftertreatment devices. However, one having ordinary skill in the art will appreciate that aftertreatment devices are largely dependent upon operating conditions, such as device operating temperature driven by exhaust gas flow temperatures.

Modern engine control methods utilize diverse operating strategies to optimize combustion. Some operating strategies, optimizing combustion in terms of fuel efficiency, include lean, localized, or stratified combustion within the combustion chamber in order to reduce the fuel charge necessary to achieve the work output required of the cylinder. While temperatures in the combustion chamber can get high enough in pockets of combustion to create significant quantities of NOx, the overall energy output of the combustion chamber, in particular, the heat energy expelled from the engine through the exhaust gas flow, can be greatly reduced from normal values. Such conditions can be challenging to exhaust aftertreatment strategies, since, as aforementioned, aftertreatment devices frequently require an elevated operating temperature, driven by the exhaust gas flow temperature, to operate adequately to treat NOx emissions.

Increasingly stringent emission standards require NOx aftertreatment methods, utilizing, for example, a selective catalytic reduction device (SCR). An SCR utilizes a reductant such as ammonia derived from urea injection or recovered from normal operation of a three-way catalyst device to treat NOx. Additionally, it is known to operate a diesel oxidation catalyst (DOC) upstream of the SCR in diesel applications to convert NO into $NO_2$ preferable to treatment in the SCR. Continued improvement in exhaust aftertreatment requires accurate information regarding NOx emissions in the exhaust gas flow in order to achieve effective NOx reduction, such as dosing proper amount of urea based on monitored NOx emissions.

Aftertreatment devices such as SCRs convert NOx to non-polluting molecules at some conversion efficiency. Conversion efficiency can be described by the flow of NOx flowing into a device versus the flow of NOx exiting the device. An aftertreatment device operating properly experiences reduced efficiency according to properties of the exhaust gas flow that affect the chemical reaction occurring in the device. For example, temperature and space velocity of the gases within an SCR device affect the efficiency of the device. These environmental factors can be monitored in the aftertreatment system, and effects of these factors upon device conversion efficiency can be estimated. Additionally, malfunctions or degraded performance caused by wear or damage can reduce the efficiency of the aftertreatment device. However, reduced efficiency can additionally occur when insufficient reductant, such as ammonia supplied by urea injection, is available on the SCR catalyst.

Presence of insufficient reductant within the SCR device to efficiently operate the SCR can have many causes. For instance, if a urea storage tank supplying urea to the injection system is empty, then insufficient reductant will be present. Another cause for insufficient reductant in the SCR device is contamination or dilution of the urea in the urea storage tank. If water is incorrectly added to the storage tank instead of urea, the efficiency of the SCR device is greatly reduced.

A number of different causes can result in reduced efficiency in an SCR device, including adverse properties in the exhaust gas flow, a malfunction or damaged catalyst in the SCR device, insufficient urea in the urea storage tank, and contaminated urea in the urea storage tank. A method to distinguish reduced efficiency in an SCR device based upon contaminated urea in the urea storage tank from other causes of reduced efficiency would be beneficial.

SUMMARY

A method for indicating a non-urea reductant fault in a powertrain including an internal combustion engine and an aftertreatment system having an aftertreatment device utilizing a catalyst to convert NOx includes monitoring a NOx content exiting the aftertreatment system subsequent to a powertrain start-up event through a test span, monitoring a measure of NOx content entering the aftertreatment system subsequent to a powertrain start-up event through the test span, and determining a measure of NOx conversion accomplished in the aftertreatment device based upon the NOx content exiting the aftertreatment system and the measure of NOx content entering the aftertreatment system. The method includes, through the test span, comparing the measure of NOx conversion determined at a start of the test span to the measure of NOx conversion at a later time within the test span. A non-urea reductant fault is indicated based upon the comparing identifying a reduction in NOx conversion accomplished in the aftertreatment device between the start of the test span and the later time within the test span.

BRIEF DESCRIPTION OF THE DRAWINGS

One or more embodiments will now be described, by way of example, with reference to the accompanying drawings, in which:

FIG. 4 illustrates conversion efficiency through a time span for three different plots, in accordance with the present disclosure;

FIG. 5 illustrates an effect of changing catalyst temperatures on the conversion efficiency fall-off described relative to FIG. 4;

DETAILED DESCRIPTION

Figure 1:
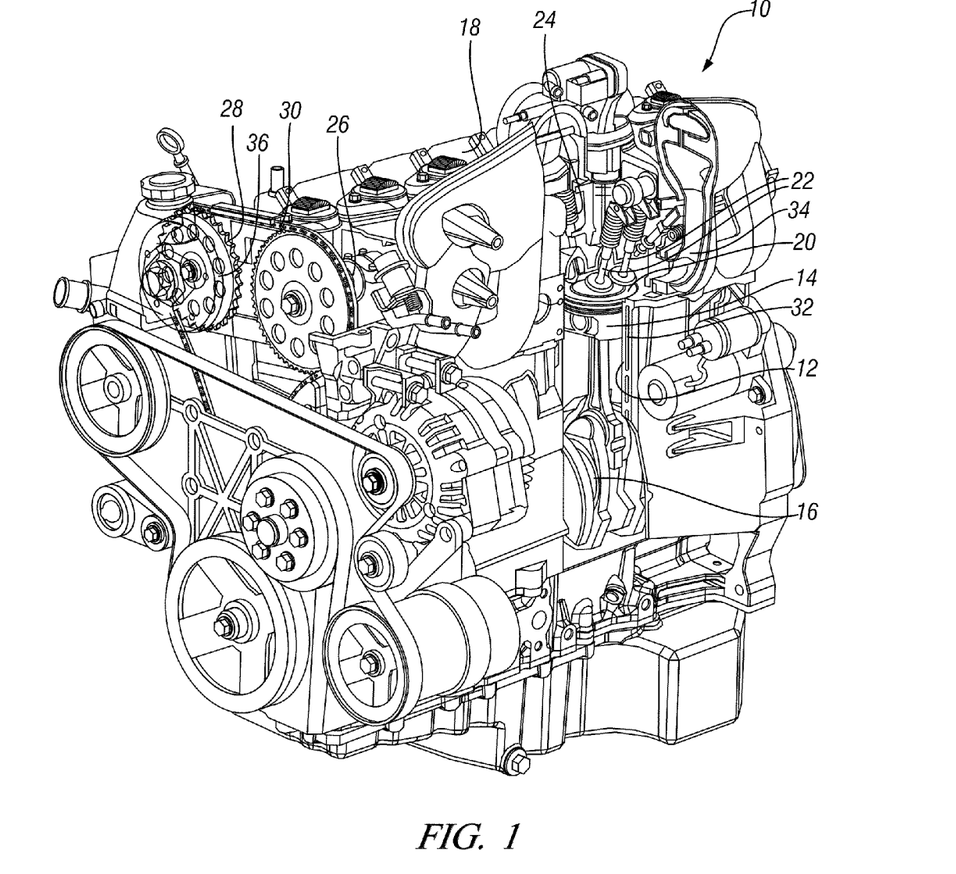
FIG. 1 schematically depicts an exemplary diesel engine, in accordance the present disclosure.

Referring now to the drawings, wherein the showings are for the purpose of illustrating certain exemplary embodiments only and not for the purpose of limiting the same, FIG. 1 is a sectional representation of an exemplary diesel engine, in accordance with the present disclosure. Engine 10 conventionally includes a plurality of cylinders 12 having therein reciprocable pistons 14 connected with a crankshaft 16. This disclosure is generally applicable to direct injection four-stroke compression ignition engines. The ends of the cylinder are closed by a cylinder head 18 so that the cylinders and pistons define variable volume combustion chambers 20.

The cylinder head is provided with intake valves 22 which control the timing and flow of intake air into the cylinders during intake strokes of the pistons. Exhaust valves 24 in the cylinder head control timing and flow of exhaust products from the combustion chambers during exhaust strokes of the pistons. In the engine shown there are two intake valves and two exhaust valves for each cylinder, however, any suitable number of valves provided for operation of the engine may be utilized in accordance with the disclosure.

The intake and the exhaust valves are actuated by separate valve actuation devices 26, 28. The valve actuation devices exclusively operate their respective intake and exhaust valves, however, both are driven by the crankshaft 16 through a timing chain 30. The exemplary configuration of FIG. 1 is known in the art as an overhead cam. However, it will be appreciated by one having ordinary skill in the art that a number of methods are known to control intake and exhaust valves. Another exemplary method includes the use of pushrods to actuate intake and exhaust valves in accordance with desired combustion cycle parameters. The disclosure envisions the use of engines with many control methods and is not intended to be limited to the particular embodiments described herein.

The exemplary engine 10 includes a cast-metal engine block with a plurality of cylinders formed therein and an engine head. The engine block preferably includes coolant passages 32 through which engine coolant fluid passes. A coolant temperature sensor, operable to monitor temperature of the coolant fluid, is located at an appropriate location, and provides a parametric signal input to a control system indicative of engine operating temperature useful in engine control. The engine preferably includes known systems including an external exhaust gas recirculation ('EGR') valve and an intake air throttle valve (not shown).

Each piston 14 is connected via a pin and connecting rod to the crankshaft 16. The crankshaft 16 is rotatably attached to the engine block at a main bearing area near a bottom portion of the engine block, such that the crankshaft is able to rotate around an axis that is perpendicular to a longitudinal axis defined by each cylinder. A crank sensor (not shown) is placed in an appropriate location, operable to generate a signal that is useable by the controller to measure crank angle, and which is translatable to provide measures of crankshaft rotation, speed, and acceleration that are useable in various control schemes. During operation of the engine, each piston 14 moves up and down in the cylinder in a reciprocating fashion due to connection to and rotation of the crankshaft 16, and the combustion process. The rotation action of the crankshaft effects translation of linear force exerted on each piston during combustion to an angular torque output from the crankshaft, which can be transmitted to another device, e.g. a vehicle driveline.

The engine head comprises a cast-metal device having one or more intake ports and one or more exhaust ports which flow to the combustion chamber 20. The intake port supplies air to the combustion chamber 20. Combusted (burned) gases flow from the combustion chamber 20 via the exhaust port. Flow of air through each intake port is controlled by actuation of one or more intake valves 22. Flow of combusted gases through each exhaust port is controlled by actuation of one or more exhaust valves 24.

The intake and exhaust valves 22, 24 each have a head portion that includes a top portion that is exposed to the combustion chamber. Each of the valves 22, 24 has a stem that is connected to a valve actuation device. A valve actuation device 26 is operative to control opening and closing of each of the intake valves 22, and a second valve actuation device 28 operative to control opening and closing of each of the exhaust valves 24. According to some exemplary valve control methods, such as a push-rod configuration, opening and closing of valves is mechanically timed according to rotation of the crankshaft. In the exemplary overhead cam configuration of FIG. 1, each of the valve actuation devices 26,28 comprises a device signally connected to the control system and operative to control timing, duration, and magnitude of opening and closing of each valve, either in concert or individually. One embodiment of the exemplary engine comprises a dual overhead cam system which has variable lift control ('VLC') and variable cam phasing ('VCP') devices as part of the valve actuation devices 26, 28. VCP devices are operative to control timing of opening or closing of each intake valve and each exhaust valve relative to rotational position of the crankshaft and opens each valve for a fixed crank angle duration. VLC devices are operative to control magnitude of valve lift to one of two positions configured to affect desired combustion results. Individual valve actuation devices can serve the same function to the same effect. The valve actuation devices are preferably controlled by the control system 25 according to predetermined control schemes. Alternative variable valve actuation devices including, for example, fully flexible electrical or electro-hydraulic devices may also be used and have the further benefit of independent opening and closing phase control as well as substantially infinite valve lift variability within the limits of the system.

Air is inlet to the intake port through an intake manifold runner 34, which receives filtered air passing through a known air metering device and a throttle device (not shown). Exhaust gas passes from the exhaust port to an exhaust manifold, which includes exhaust gas sensors operative to monitor constituents of the exhaust gas flow, and determine parameters associated therewith. The exhaust gas sensors can comprise any of several known sensing devices operative to provide parametric values for the exhaust gas flow, including air/fuel ratio, or measurement of exhaust gas constituents, e.g. NOx, CO, HC, and others. The system may include an in-cylinder sensor for monitoring combustion pressures, or non-intrusive pressure sensors or inferentially determined pressure determination (e.g. through crankshaft accelerations). The aforementioned sensors and metering devices each provide a signal as a parametric input to the control system. These parametric inputs can be used by the control system to determine combustion performance measurements.

The control system preferably comprises a subset of an overall control architecture operable to provide coordinated system control of the engine 10 and other systems. In overall operation, the control system is operable to synthesize operator inputs, ambient conditions, engine operating parameters, and combustion performance measurements, and execute algorithms to control various actuators to achieve targets for control parameters, including such parameters as fuel economy, emissions, performance, and drivability. The control system is operably connected to a plurality of devices through which an operator controls or directs operation of the engine. Exemplary operator inputs include an accelerator pedal, a brake pedal, transmission gear selector, and vehicle speed cruise control when the engine is employed in a vehicle. The control system may communicate with other controllers, sensors, and actuators via a local area network ('LAN') bus (not shown) which preferably allows for structured communication of control parameters and commands between various controllers.

The control system is operably connected to the engine 10, and functions to acquire parametric data from sensors, and control a variety of actuators of the engine 10 over appropriate interfaces. The control system receives an engine torque command, and generates a desired torque output, based upon the operator inputs. Exemplary engine operating parameters that are sensed by control system using the aforementioned sensors include engine coolant temperature, crankshaft rotational speed ('RPM') and position, manifold absolute pressure, ambient air flow and temperature, and ambient air pressure. A sensor capable of monitoring crankshaft rotational position can be utilized to monitor or determine a progression of the engine and various cylinders through various stages of a combustion cycle. Combustion performance measurements may comprise measured and inferred combustion parameters, including air/fuel ratio, location of peak combustion pressure, among others.

Actuators controlled by the control system include: fuel injectors (not shown); the VCP/VLC valve actuation devices 26, 28; EGR valve (not shown), and, electronic throttle control module (not shown). Additionally, an EGR bypass valve, useful to selectively bypass an EGR cooler and channel exhaust gas of particular properties through the EGR circuit, can be controlled. Fuel injectors are preferably operable to inject fuel directly into each combustion chamber 20.

The control system preferably comprises a general-purpose digital computer generally including a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each controller has a set of control algorithms, comprising resident program instructions and calibrations stored in ROM and executed to provide the desired functions.

Algorithms for engine control may be executed during preset loop. Algorithms stored in the non-volatile memory devices are executed by the central processing unit and are operable to monitor inputs from the sensing devices and execute control and diagnostic routines to control operation of the engine, using preset calibrations. Loop cycles may be executed at regular intervals, for example each 3.125, 6.25, 12.5, 25 and 100 milliseconds during ongoing engine operation. Alternatively, algorithms may be executed in response to occurrence of an event or interrupt request.

FIG. 1 describes an exemplary diesel engine. However, it will be appreciated that NOx treatment and aftertreatment systems are utilized in other engine configurations including gasoline engines, and the disclosure is not intended to be limited to the specific exemplary engine embodiment described herein.

Figure 2:
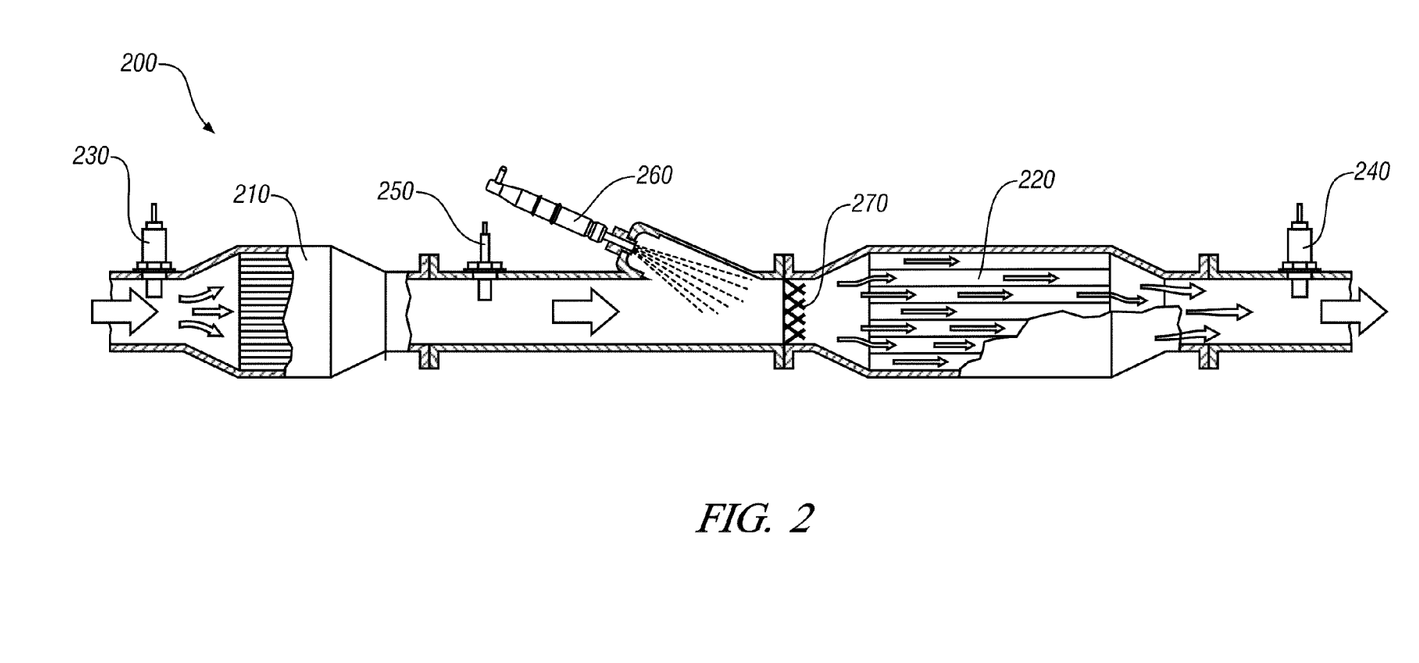
FIG. 2 schematically depicts an exemplary aftertreatment system, in accordance with the present disclosure.

FIG. 2 schematically illustrates an exemplary aftertreatment system, in accordance with the present disclosure. Aftertreatment system 200 comprises DOC 210, SCR 220, upstream NOx sensor 230, downstream NOx sensor 240, temperature sensor 250, and urea dosing module 260. As is known in the art, DOC 210 performs a number of catalytic functions necessary to aftertreatment of an exhaust gas flow. One of the functions of DOC 210 is to convert NO, a NOx pollutant not easily treated in an SCR, into $NO_2$, a NOx pollutant easily treated in an SCR. SCR 220 utilizes ammonia from urea as a reductant to reduce NOx into nonpolluting molecules. Upstream NOx sensor 230 detects and quantifies NOx in the exhaust gas flow entering aftertreatment system 200. While upstream NOx sensor 230 is illustrated as an exemplary means to quantify NOx entering the aftertreatment system, it should be noted that NOx entering the system can be quantified for use in evaluating conversion efficiency in an SCR by other means, for example, through a NOx sensor located between DOC 210 and SCR 220 or through a virtual NOx sensor modeling engine output and conditions within the exhaust gas flow to estimate the presence of NOx entering the aftertreatment system. This disclosure in general discusses a sensor input describing NOx entering the aftertreatment system in accordance with the exemplary embodiment, however it will be appreciated that, depending upon upstream sensor placement, the input could actually describe NOx content entering a portion of the aftertreatment system. SCR 220 utilizes ammonia, for example, as derived from injected urea, to convert NOx to nonpolluting molecules by methods known in the art. Temperature sensor 250 is depicted, located in a region to gather exhaust gas flow temperatures within the aftertreatment system 200. Additionally, a temperature sensor can be utilized downstream (not shown) of SCR 220 near the location of downstream NOx sensor 240, for exemplary use in estimating operation of the SCR device and parameters therewithin. Urea dosing module 260 is depicted in a position upstream of SCR 220. The urea can be directly sprayed into the exhaust gas flow entering the SCR. However, a preferred method is depicted, utilizing a mixer device 270. Urea dosing module 260 injects urea onto mixer device 270, and the urea is then carried by the exhaust gas flow in a substantially even distribution onto the catalyst surfaces on the interior of SCR 220. Downstream NOx sensor 240 detects and quantifies NOx in the exhaust gas flow exiting aftertreatment system 200. A method is disclosed to utilize a measure of the NOx entering the aftertreatment system and a measure of the NOx exiting the aftertreatment system to determine the conversion efficiency of the NOx into nonpolluting molecules within aftertreatment devices.

Conversion efficiency is described as the efficiency with which an aftertreatment device can convert NOx into nonpolluting molecules. The exemplary aftertreatment system described above describes a measured or estimated NOx content of the exhaust gas flow measured upstream of the aftertreatment device being analyzed. This measure of NOx entering the aftertreatment system can be described at any time t as x(t). The exemplary aftertreatment system described above describes a measured or estimated NOx content of the exhaust gas flow measured downstream of the aftertreatment device being analyzed. This measure of NOx exiting the aftertreatment system can be described at any time as y(t). Conversion efficiency at any given time by the following equation.

$$\eta_{ACTUAL}(t) = 1 - \frac{y(t)}{x(t)} \quad [1]$$

It will be appreciated that this equation provides the conversion efficiency at any instant in time. In this way, measured or estimated values of NOx entering and exiting the aftertreatment system can be utilized to determine an estimated or calculated actual conversion efficiency of the aftertreatment system.

A properly operating or fresh aftertreatment device operates with some maximum achievable conversion efficiency for a given set of conditions. However, it will be appreciated that aftertreatment devices, particularly devices utilizing a catalyst, are subject to degraded performance over time and in particular with exposure to high temperatures.

Conversion efficiency in a fresh device is affected by a number of environmental or operational factors. Conversion efficiency for an exemplary SCR can be determined by a model expressed by the function.

$$\eta = f(T_{BED}, SV, \theta_{NH_3}, x(t), V_{UREA}, \rho_{CELL}) \quad [2]$$

$T_{BED}$ describes the temperature of the catalyst bed within the SCR. This temperature can be directly measured or can be estimated based upon temperature, flow rate, and other properties of the exhaust gas flow. SV describes the surface velocity of exhaust gas flowing through the SCR device and can be determined as a function of properties of the exhaust gas flow, including temperature and flow rate. $\theta_{NH_3}$ describes an amount of ammonia storage on the catalyst bed, and adequate presence of ammonia on the SCR is required to achieve the desired NOx conversion reaction. $\theta_{NH_3}$ can be estimated, for example, by analyzing ammonia adsorbtion and desorbtion rates, NOx conversion rates, and adsorbed ammonia oxidation rates. As described above, x(t) describes the presence of NOx in the exhaust gas flow entering the aftertreatment system. Low levels of NOx are easily reacted within a properly functioning SCR, while levels of NOx above a certain threshold are more difficult to react and correspond to lower conversion efficiencies. An example of a factor limiting treatment of NOx above certain quantities includes limited ammonia present in an SCR. $V_{UREA}$ describes the volume of urea injected. While $V_{UREA}$ describes a presence of ammonia similarly to $\theta_{NH_3}$, $V_{UREA}$ includes a present measure of urea being injected and can better describe transient indicator for ammonia expected to be present in the near future. $\rho_{CELL}$ describes the density of catalyst material within the SCR and, therefore, describes a capacity of the SCR to catalyze the intended reaction.

The above model describing conversion efficiency includes factors which can be assumed or confirmed in normal operation of an SCR. As a result, the model can be simplified, thereby reducing a processing load required to analyze conversion efficiency through the model. For example, a $V_{UREA}$ can be monitored through operation of the urea dosing module, and given $V_{UREA}$ values in a particular intended range, the resulting conversion efficiency calculations should remain unaffected. In some embodiments, $V_{UREA}$ is controlled to be substantially directly proportional to x(t). Additionally, $\theta_{NH_3}$ can in some embodiments be estimated based upon $V_{UREA}$, monitored characteristics of the exhaust gas flow and of the SCR, such as temperature, and x(t). Given $\theta_{NH_3}$ values in a normal range, $\theta_{NH_3}$ can be reduced to a portion of the functional model dependent upon $T_{BED}$. A value for x(t), as described above, can be monitored through an upstream NOx sensor or a virtual NOx sensor. $\rho_{CELL}$ is a characteristic of the SCR device and is a known value. As a result of these known or estimable factors, conversion efficiency for an exemplary SCR can be determined by a model expressed by the function.

$$\eta = f(T_{BED}, SV, \theta_{NH}) \quad [3]$$

In this way, conversion efficiency of the SCR can be accurately determined as an on board diagnostic function by maintaining other factors within known or calibrated ranges.

A normally operating SCR device under proper operating conditions will produce predictable efficiency results in test results tracking efficiency. Different causes of reduced efficiency in an SCR device will produce different results in test results tracking efficiency. For example, reduced efficiency caused by a permanently damaged or malfunction catalyst will tend to produce muted efficiency results throughout a test. Reduced efficiency caused by excessively high or low exhaust gas temperatures likewise shows particular results in test result data that are distinguishable from other causes of reduced efficiency. Additionally, exhaust gas temperatures are closely tracked as part of the urea injection method, as effectiveness of urea injection is highly dependent upon temperatures within the SCR device. Reduced efficiency caused by a presence of insufficient reductant or a lack of reductant similarly shows particular results in test result data that are distinguishable.

Figure 3:
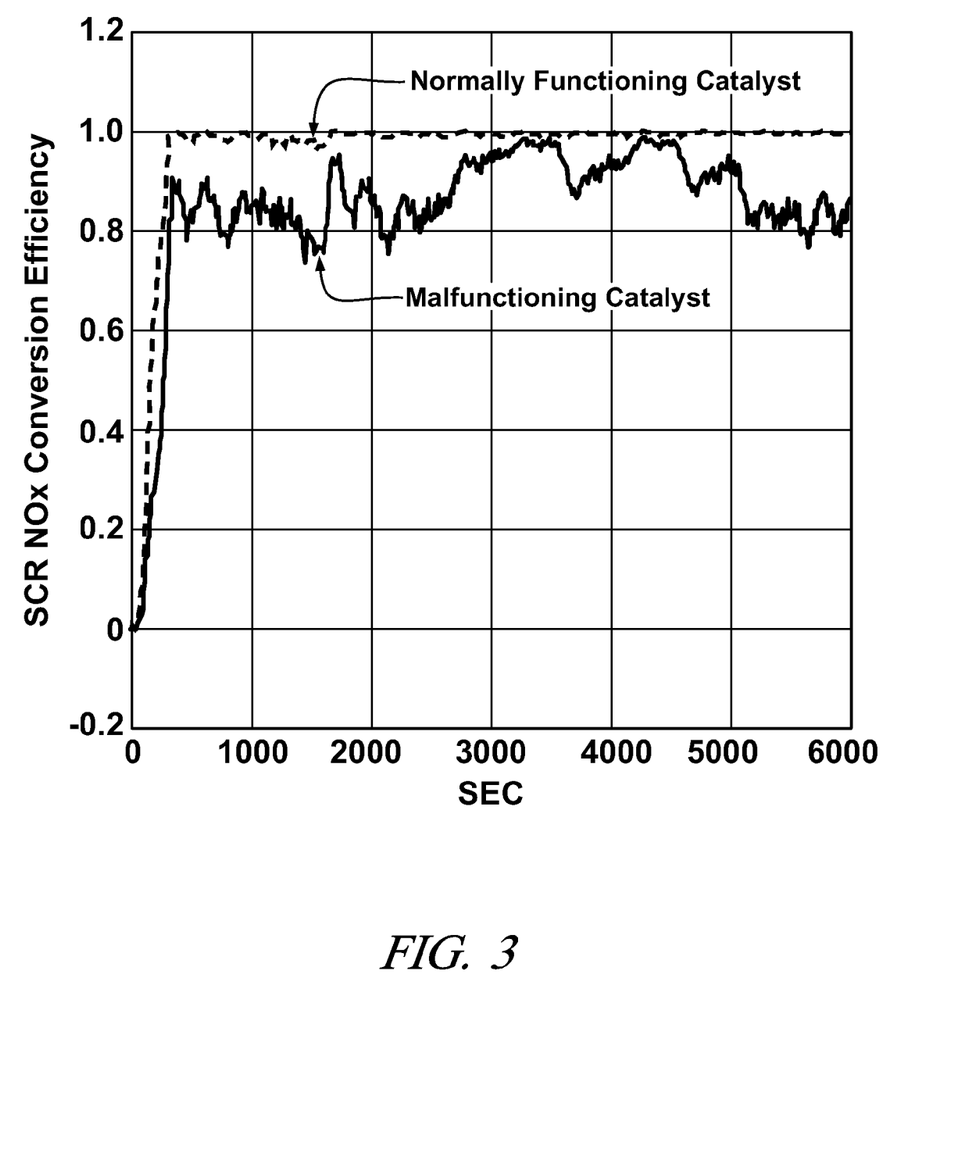
FIG. 3 graphically illustrates exemplary test results displaying conversion efficiency in a normally functioning catalyst and a malfunctioning catalyst through a time span, in accordance with the present disclosure.

FIG. 3 graphically illustrates exemplary test results displaying conversion efficiency in a normally functioning catalyst and a malfunctioning catalyst through a time span, in accordance with the present disclosure. Conversion efficiency in an SCR device with a normally functioning catalyst, as depicted in the exemplary test results, is very close to one, describing an SCR accomplishing almost complete conversion in NOx. Conversion efficiency in an SCR device with a malfunctioning catalyst, as depicted in the exemplary test results, is significantly below one, describing an SCR failing to accomplish complete conversion in NOx, instead allowing some amount of NOx to pass through the device. It will be appreciated by one having ordinary skill in the art, with all factors affecting conversion efficiency being held constant through the time span of the test, that the efficiency of the malfunctioning catalyst remains substantially in a constant range.

Figure 4:
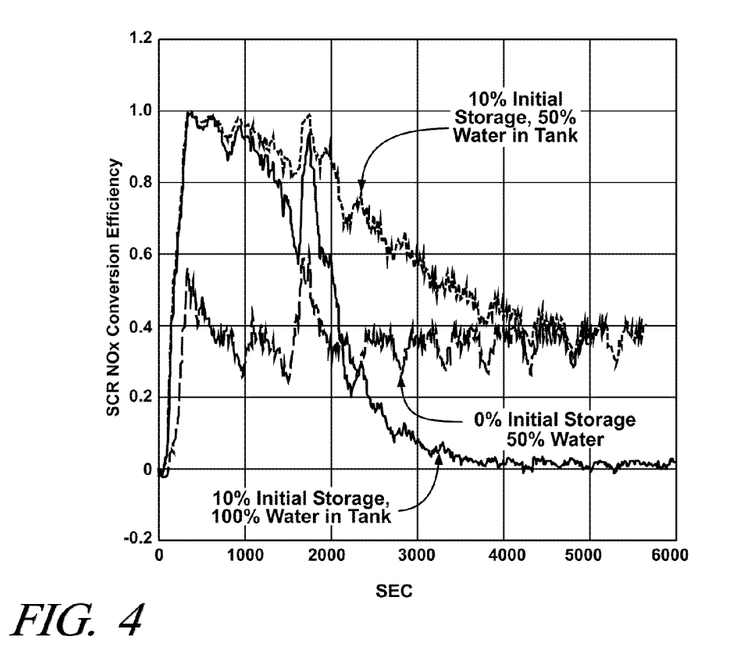
FIGS. 4 and 5 graphically illustrate exemplary test result data showing efficiency results for a system with insufficient reductant or no reductant under different circumstances, in accordance with the present disclosure.
Figure 5:
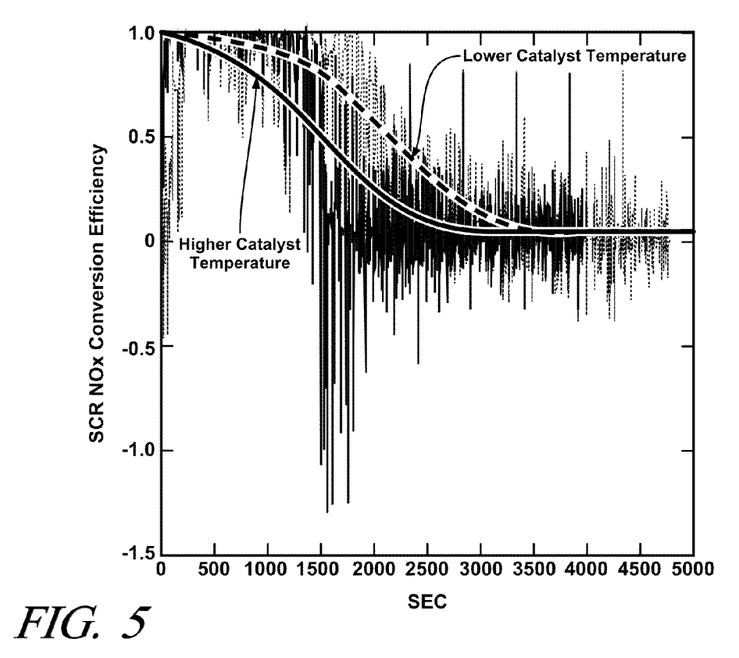

FIGS. 4 and 5 graphically illustrate exemplary test result data showing efficiency results for a system with insufficient reductant or no reductant under different circumstances, in accordance with the present disclosure. FIG. 4 illustrates conversion efficiency through a time span for three different plots. A first plot describes a system with zero reductant initially on the SCR catalyst, and with a 50% urea, 50% water mixture in the urea storage tank. As the plot reveals, the conversion efficiency of the SCR remains substantially in a constant range through the test period. However as revealed by the second and third plots, describing systems with some initial reductant storage on the catalyst, a pattern exists where existing reductant on the catalyst remains effective to converting NOx for some time into the test period. However, as the test progresses, and as the reductant on the catalyst fails to be replenished by uncontaminated urea injection, the conversion efficiency falls to some level indicated by the concentration of urea in the urea storage tank. Of the second and third plots, the second plot includes initial ammonia storage on the catalyst and a 50% urea, 50% water mixture in the urea storage tank, similar to the first plot. With other variables being held constant, the second plot eventually settles into a substantially constant range similar to the range displayed in the first plot. The third plot is similar to the second plot, includes initial ammonia storage on the catalyst. However, the third plot includes data related to a urea storage tank filled with 100% water. As a result, the conversion efficiency, in the exemplary test results, settles quickly to zero, with no reductant being replenished on the catalyst surface. This fall-off in conversion efficiency is descriptive of a powertrain start-up, where the urea storage tank was refilled since the last powertrain shut-down with a diluted, contaminated, or incorrect substance. This fall-off is useful to identify presence of dilution or contamination in the urea storage tank, and can be used to avoid false indications of other causes to low conversion efficiency in the SCR device.

As described above, other factors besides reductant presence can impact conversion efficiency, such as exhaust flow or catalyst temperatures. Additionally, catalyst temperatures can affect how long reductant initially stored on the catalyst will remain present. FIG. 5 illustrates an effect of changing catalyst temperatures on the conversion efficiency fall-off described relative to FIG. 4. Two plots are illustrated depicting test results of systems including initial reductant storage on a catalyst surface and 100% water in a urea storage tank. Raw data is depicted as well as calculated trend lines for the data. A first plot wherein the temperature of the catalyst was maintained at a lower temperature (560K) and a second plot wherein the temperature of the catalyst was maintained at a higher temperature (600K) are depicted. As is evident in the test results, increased catalyst temperature causes the reductant initially on the surface of the SCR to dissipate more quickly than the reductant on the surface of the lower temperature catalyst. This information is useful to set a calibratable test period required to diagnose a non-urea reductant upon powertrain start-up. According to this behavior, a look-up table or simple function can be programmed to set a test period according to a measured, determined, or predicted catalyst temperature.

A method is disclosed to utilize test results displaying a conversion efficiency fall-off in an SCR device to indicate a non-urea reductant fault. A number of methods are contemplated to indicate such a fall-off behavior. A model could plot a trend-line in test results or average efficiency in test results and make comparisons of the trend-line to threshold values. In the alternative, minimum efficiency values averaged in some window could be compared to other efficiency values of other windows or to an absolute threshold to indicate test failure. A method is disclosed to compare a conversion efficiency error averaged in a first window of a test, calculated as a difference between a measured average test value in the first window to a predicted test value in the first window, to a conversion efficiency error averaged in a subsequent window of the same test, calculates as a difference between a measured average test value in the subsequent window and a predicted test value in the subsequent window. The comparison on these differences can be compared to a diagnostic threshold value, and a non-urea reductant fault can be issued in the event that the diagnostic threshold value is violated. The fault can be issued for a single violation. In the alternative, depending upon the reliability of the test results in particular with reference to signal noise and the effects of other factors upon conversion efficiency, a non-urea reductant can be generated based upon repeated failure in comparison to the diagnostic threshold.

Figure 6:
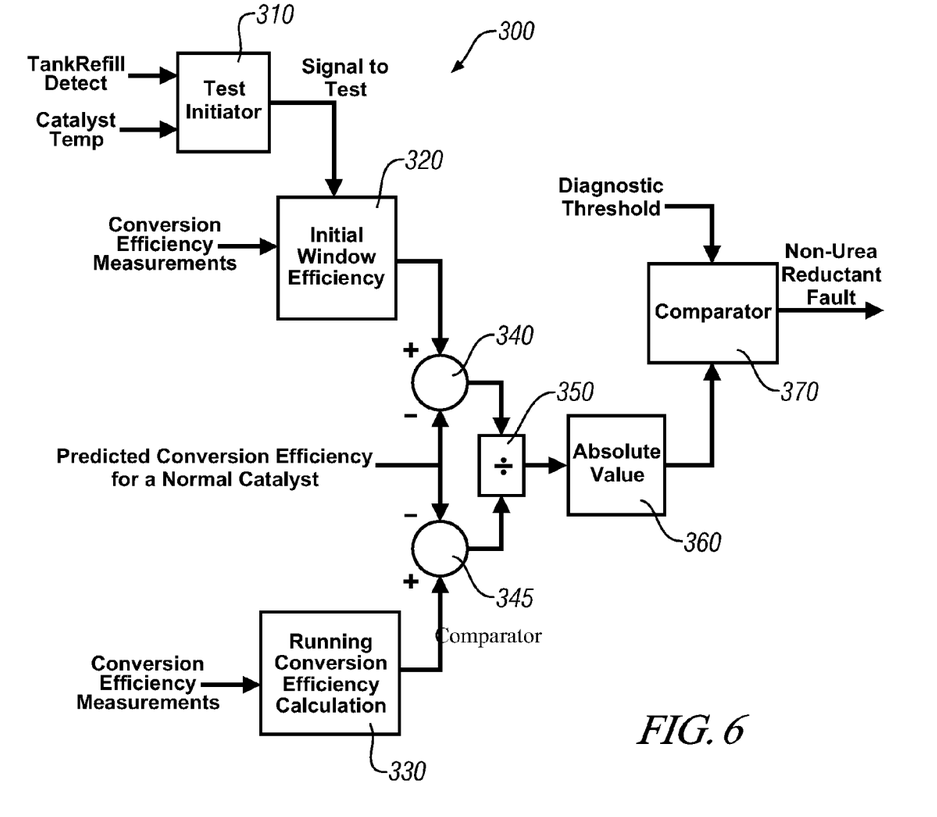
FIG. 6 schematically depicts an exemplary information flow comparing conversion efficiency through a test period, in order to determine a non-urea reductant fault, in accordance with the present disclosure.

FIG. 6 schematically depicts an exemplary information flow comparing conversion efficiency through a test period, in order to determine a non-urea reductant fault, in accordance with the present disclosure. Information flow 300 includes a test initiator module 310, an initial window efficiency calculation module 320, a running conversion efficiency calculation module 330, summing modules 340 and 345, a division module 350, an absolute value module 360, and a comparator module 370. The methods described herein can be run upon every start-up of the powertrain. In the exemplary embodiment of FIG. 6, test initiator module 310, rather than initiating a test upon every start-up, gathers information to determine an appropriate condition to signal a test. As described above, a test is most likely to correctly diagnose a non-urea reductant immediately following a urea storage tank fill-up. Module 310 monitors a tank refill detection signal to indicate a test is appropriate. The tank refill signal can include simple indications from a urea storage tank fill level sensor or can be a processed signal from another module (not shown). Additionally, because catalyst temperature is important to conversion efficiency, a stable catalyst temperature within a calibrated range can be required to perform the non-urea reductant test. Module 310, upon monitoring a tank refill event and monitoring catalyst temperatures within an acceptable range, generates a signal to test.

Figure 7:
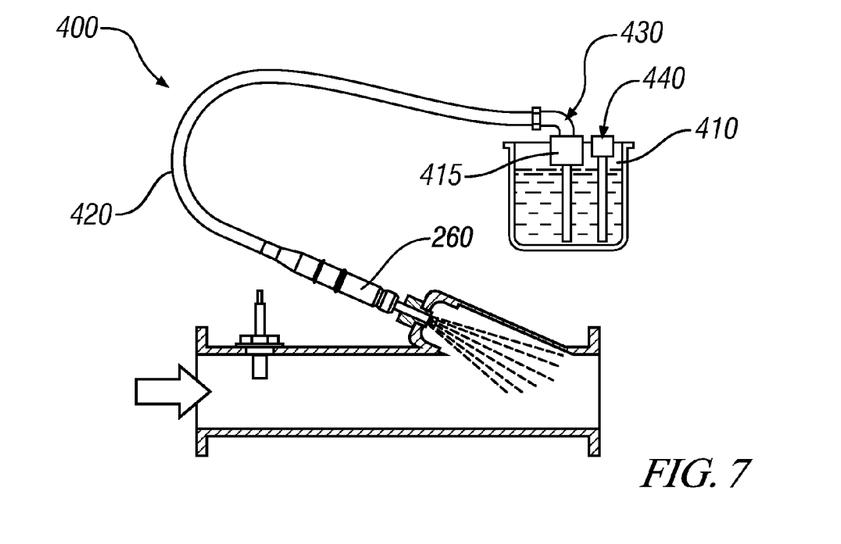
FIG. 7 schematically depicts an exemplary urea storage tank, including sensors utilized to operate urea injection, in accordance with the present disclosure.

FIG. 7 schematically depicts an exemplary urea storage tank, including sensors utilized to operate urea injection, in accordance with the present disclosure. Urea injection system 400 comprises a urea dosing module 260, a urea storage tank 410, a urea pump 415, a urea delivery line 420, a urea deliver line pressure sensor 430, and a tank fill level sensor 440. Urea dosing module 260 is described above in association with FIG. 2. Urea storage tank 410 includes a volume wherein an amount of urea can be stored for eventual use in the aftertreatment system. Urea pump 415 is a device, preferably electrically powered, capable of drawing urea from tank 410 and delivering pressurized urea to urea delivery line 420. Pump 415 can be integrally connected to tank 410, or pump 415 can exist separately outside of the tank. Urea delivery line 420 links the tank 410 to urea dosing module 260. Pressure sensor 430 is communicably connected to line 420 and functions to allow accurate pressurization of line 420 to some calibrated line pressure. Urea fill level sensor 440 functions to output an approximate volume of liquid present in tank 410. A signal from sensor 440 can be utilized to generate a tank refill detect signal as depicted in FIG. 6.

Returning to FIG. 6, initial window efficiency calculation module 320 monitors the signal to test from module 310. Upon initiation of a test, module 320 measures an average conversion efficiency for the SCR device through a window. The average conversion efficiency can be calculated through the following equation.

$$\bar{\eta} = 1 - \frac{\bar{y}}{\bar{x}} \qquad [4]$$

In this exemplary equation, conversion efficiency measurements monitored by module 320 include a plurality of x(t) and y(t) values, and an average for these values are determined. One particular embodiment through which Equation 4 might be utilized includes the following.

$$\eta = 1 - \frac{\int y(t) * dt}{\int x(t) * dt} \qquad [5]$$

One having ordinary skill in the art will appreciate that Equations 4 and 5 essentially yield a fraction of NOx converted in the device as compared to the inflow of NOx to the device. As described above, in a situation wherein reductant remains on the surface of the catalyst from operation prior to the last powertrain shut-down, an efficiency at or close to a normal conversion efficiency can be indicated in test results. Determining the conversion efficiency of the device in the first window as a baseline measurement allows perception of the fall-off described above, indicating an inadequate urea injection to replenish the reductant. As an alternative to the conversion efficiency in the first window, an accepted baseline for current conditions and operating ranges could be output from a model determining an acceptable baseline conversion efficiency. However, such a model based method would inherently be prone to false indications of non-urea reductant faults based upon inaccurate baseline predictions of the model, whereas utilizing actual measurements from the first window is less prone to such inaccuracies. The duration of the first test window, utilized to take an average efficiency through the window, must be short enough to miss any predicted fall-off in conversion efficiency. However, the window must also be long enough to filter out signal noise and other transient effects in the efficiency calculation. The conversion efficiency for the first window determined in module 320 is output to summing module 340. In summing module 340, the conversion efficiency for the first window is summed with a predicted conversion efficiency for a normal catalyst in the first window. The predicted conversion efficiency for the normal catalyst can be a value based upon historical data, can be generated through lookup charts, or can be an output from a model sufficient to describe behavior of an SCR device. However, testing has shown that, because a properly functioning SCR under normal operation frequently operates at near complete efficiency, a simplification can be made to the method described in FIG. 6 by assuming the predicted conversion efficiency of the normal catalyst to be equal to one. Summing module 340 therefore outputs the difference between the conversion efficiency for the first window minus the predicted conversion efficiency or a value of one. Running conversion efficiency calculation module 330 performs similarly to module 320, utilizing Equation 4 or a similar calculation to determine an average conversion efficiency of the SCR through a subsequent window of the test. The length of the period of any subsequent window can be the same length as the period of the first window, but need not be the same length. Additionally, the length of each subsequent window can be but need not be the same length. Module 330 monitors conversion efficiency measurements and outputs a conversion efficiency for at least one window subsequent to the first window. As with the inputs to summing module 340, summing module 345 monitors the conversion efficiency of a subsequent window from module 330 and outputs a difference between a predicted conversion efficiency for a normal catalyst in that window or a value of one, and module 345 outputs the difference. Difference values from summing modules 340 and 345 are inputs to division module 350. A ratio of the difference values is determined describing a ratio sensitive to differences between the conversion efficiency determined for the first window and the conversion efficiency developed for the subsequent window. The ratio value developed in module 350 can be expressed by the following equation.

$$\text{Ratio} = \frac{\bar{\eta}_{SubsequentWindow}}{\bar{\eta}_{FirstWindow}} \qquad [6]$$

In particular in situations wherein a determined conversion efficiency can be close to one, error and signal noise can cause either of the difference values to be a positive or a negative value. Such a change in sign of a difference value can cause the ratio determined in module 350 to change signs. Absolute value module 360 corrects the ratio value to a positive value. Comparator module 370 compares the ratio value to a calibrated or determined diagnostic threshold value. The threshold value is set at a value indicating a significant drop in conversion efficiency from the first window to the subsequent window. In the context of the ratio, if both the efficiency for the first window and the efficiency for the subsequent window are consistent values, then the ratio should be near one. If a significant drop in conversion efficiency occurs between the first window and the subsequent window, the ratio, as determined by exemplary Equation 5, will quickly rise to a number greater than one. Selection of an appropriate diagnostic threshold value allows determination of a non-urea reductant fault. The method described in FIG. 6 can be executed one or two times through a test period or can be executed many times through the defined test period, with the limitation that the windows must be sufficiently long to allow for accurate average values to be determined. Used in this way, conversion efficiency can be utilized to determine a measure of NOx conversion in an SCR device and indicate a non-urea reductant fault based upon the measure of NOx conversion.

Figure 8:
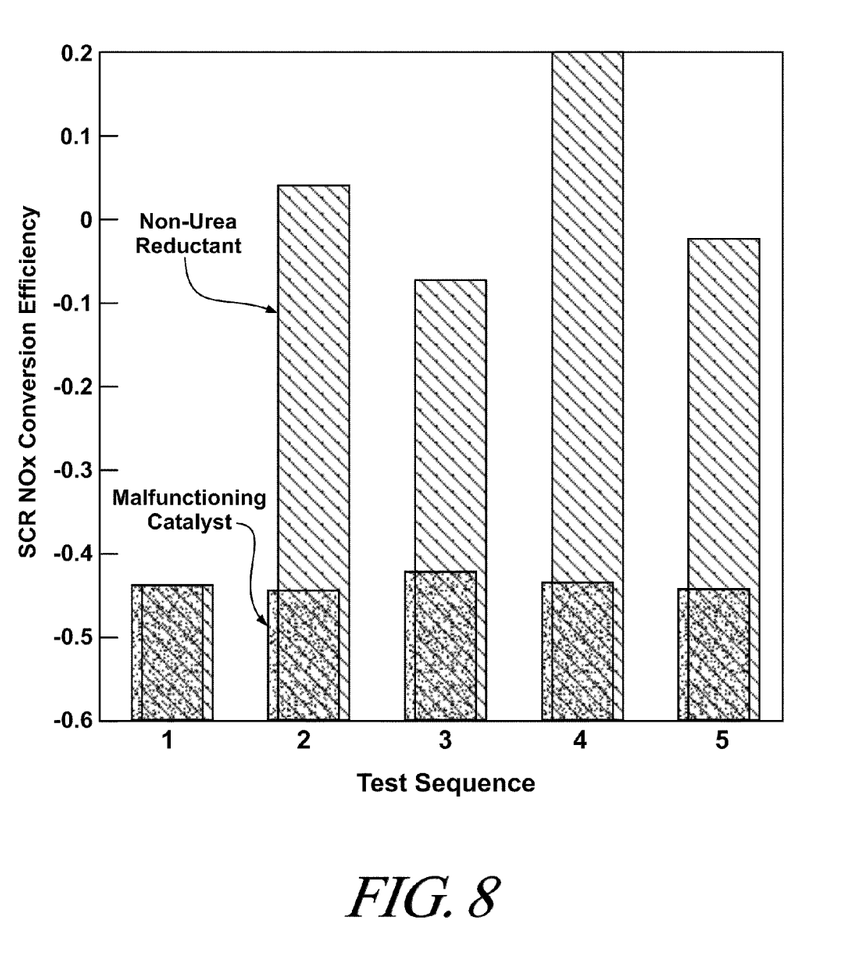
FIG. 8 graphically illustrates an exemplary comparison of ratio values determined according to the method of FIG. 6 to a diagnostic threshold, in accordance with the present disclosure.

FIG. 8 graphically illustrates an exemplary comparison of ratio values determined according to the method of FIG. 6 to a diagnostic threshold, in accordance with the present disclosure. A ratio of NOx conversion efficiencies with respect to baseline or initial window conversion efficiency is depicted across 5 test sequence samples. Two sets of data are depicted: a first wherein a malfunctioning catalyst is utilized to generate the data and a second wherein contaminated or diluted urea in a urea storage tank and a catalyst with an initial quantity of reductant is utilized to generate the data. The first test sequence sample for both data sets is the first window sample. Because the first window test sequence sample is the baseline sample, this ratio equals one. In the data set describing the malfunctioning catalyst, as described above, some level of deteriorated conversion efficiency is maintained throughout the test. Although efficiency is reduced from a normal efficiency near one, the reduction in efficiency stays within a range wherein the baseline value was also created. Therefore, ratios in the first data set stay near one. In the second data set, as described above, an initially high conversion efficiency related to the reductant initially present on the catalyst reduces quickly. As described in associated with FIG. 6, this causes high ratios as depicted in FIG. 8 with respect to the baseline value. By selecting an appropriate diagnostic threshold, in this particular example, a calibrated threshold ratio selected at a ratio of two and a half, a non-urea reductant fault can be determined based upon comparison of the ratio values to the diagnostic threshold.

A non-urea reductant fault can be generated based upon a single comparison between a conversion efficiency in a subsequent window and a diagnostic threshold determined according to the exemplary methods above. In the alternative, based upon noisy signals or other sources of error, generating a fault can be based upon a plurality of conversion efficiencies or an average of several conversion efficiencies confirming validity of a reduced conversion efficiency determination.

Figure 9:
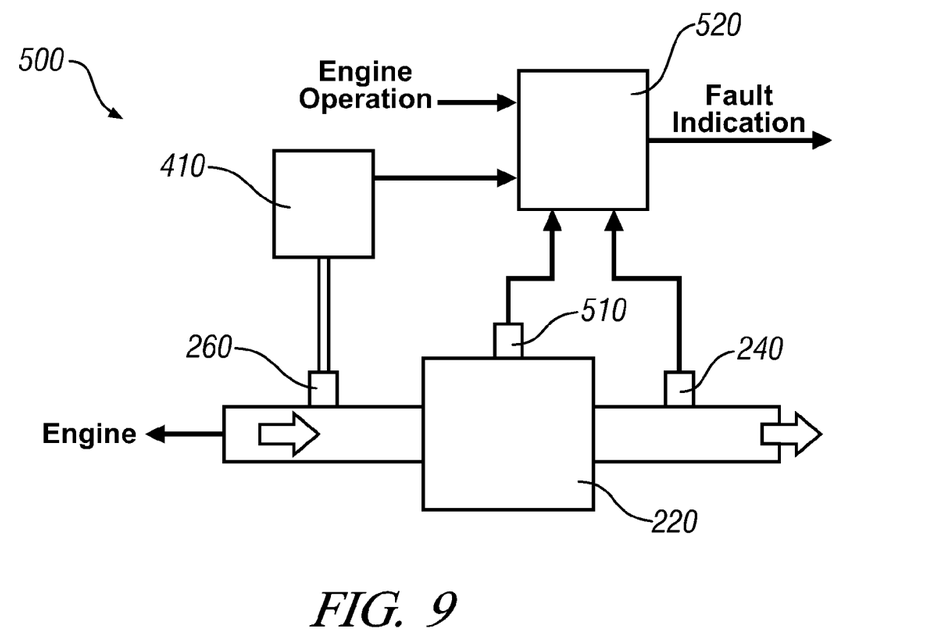
FIG. 9 schematically illustrates use of an exemplary SCR conversion efficiency module, in accordance with the present disclosure.

FIG. 9 schematically illustrates use of an exemplary SCR conversion efficiency module, in accordance with the present disclosure. Aftertreatment system 500 comprises SCR device 220, downstream NOx sensor 240, urea dosing module 260, urea storage tank 410, an SCR catalyst bed temperature sensor 510, and an SCR conversion efficiency module 520. SCR conversion efficiency module 520 monitors information regarding conversion efficiency of device 220 and indicates a non-urea reductant fault according to methods described herein. As described above, the methods described to analyze conversion efficiency can include an upstream NOx sensor or the methods can include a virtual NOx sensor including a model describing NOx output of an engine communicably attached to the aftertreatment system. In the present embodiment, details regarding engine operation are monitored from a remote module or system, such as an engine control module. These details regarding engine operation are used by programming within module 520 to estimate NOx creation in the engine subsequently entering the aftertreatment system or x(t). Data is additionally monitored from temperature sensor 510 describing catalyst temperature, tank 410 regarding refill events and urea dosing to the aftertreatment system, and downstream NOx sensor 240 regarding y(t) and processed according to methods described herein.

The exemplary method of FIG. 6 is one preferential embodiment of a comparison of conversion efficiencies between the baseline first window efficiency and subsequent efficiencies. Generating the conversion efficiency error terms described above amplifies small differences in the conversion efficiencies of the various windows and creates resulting ratios with relatively large numbers. However, one without ordinary skill in the art will appreciate that this preferred comparison is merely an exemplary tool for analyzing conversion efficiencies for the various windows, and the disclosure is not intended to be limited to this particular exemplary mathematical tool for use in the comparison.

Figure 10:
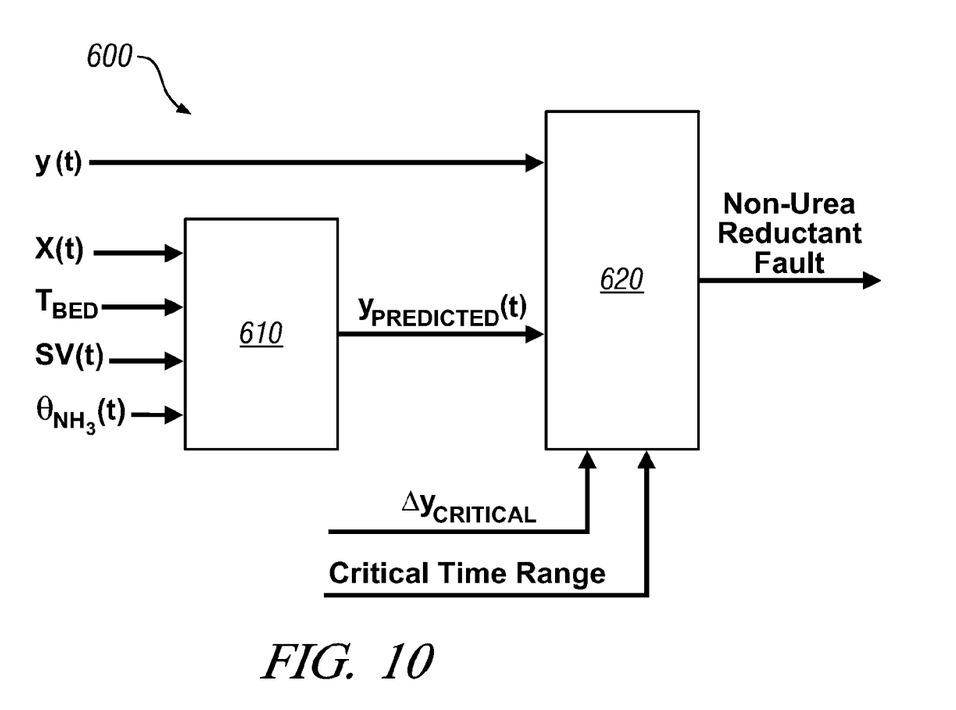
FIG. 10 schematically depicts an exemplary information flow comparing downstream NOx sensor measurements to a predicted downstream NOx value through a test period, in order to determine a non-urea reductant fault, in accordance with the present disclosure.

Conversion efficiency is one method to ascertain the occurrence of reduced NOx treatment in an SCR device. However, other methods to detect decreased conversion of NOx are contemplated. For example, monitoring NOx at the downstream NOx sensor, y(t), can yield results similar to monitoring conversion efficiency as described above. For example, in a condition wherein a reductant is present initially on the surface of the catalyst but is not being replenished adequately, y(t) can start at low values and quickly rise to levels not corresponding to proper NOx treatment in a functioning SCR device. In such a method, a simple y(t) threshold measurement in combination with a characteristic time range into operation, corresponding to initial reductant on the SCR dissipating, could be used to indicate a non-urea reductant fault. In the alternative, y(t) could be predicted based upon a model predicting SCR operation and compared to actual y(t) readings in order to indicated a non-urea reductant fault. FIG. 10 schematically depicts an exemplary information flow comparing downstream NOx sensor measurements to a predicted downstream NOx value through a test period, in order to determine a non-urea reductant fault, in accordance with the present disclosure. Information flow 600 comprises a downstream NOx prediction module 610 and a downstream NOx comparator module 620. Downstream NOx prediction module 610 monitors a number of inputs indicative of SCR operation, including x(t), $T_{BED}$, SV(t), and $\theta_{NH_3}$. Programmed calculations within module 610 determine a $y_{PREDICTED}(t)$ value. Downstream NOx comparator module 620 compares y(t) to $y_{PREDICTED}(t)$ and applies a diagnostic criteria to the values in order to indicate a non-urea reductant fault. This diagnostic criteria can take many forms including thresholds and time ranges seeking to identify an increasing $\Delta y$, describing a difference between y(t) and $y_{PREDICTED}(t)$, corresponding to a decreasing conversion efficiency and describing an SCR not being adequately replenished with reductant, as described above. Alternatively, module 620 can include an SCR model utilizing programmed calculations, based upon a data curve of $\Delta y$, to diagnose an SCR not operating according to expected treatment parameters associated with an adequate supply of reductant. The criteria utilized within module 620 to indicate a non-urea reductant fault can take many forms, utilizing SCR operational behaviors to diagnose a time dependant reduction in SCR performance associate with increase in $\Delta y$, and the disclosure is not intended to be limited to the particular embodiments described herein. In the exemplary embodiment of FIG. 10, a $\Delta y_{CRITICAL}$ term is depicted describing a difference between y(t) and $y_{PREDICTED}(t)$ illustrating a significant departure in NOx present at downstream the downstream sensor from a predicted value, and a critical time range is depicted, describing a delay from initially normal values, wherein values found to be newly violating the $\Delta y_{CRITICAL}$ value can be utilized to diagnose and indicate a non-urea reductant fault. Use of $\Delta y_{CRITICAL}$ and the critical time range can take the form of a first window within a test span, selected to be before the expiration of the critical time range, and a subsequent window or windows after expiration of the critical time range, each window examining the behavior of $\Delta y$ as compared to a baseline $\Delta y$ defined by the first window. Used in this way, y(t) can be utilized to determine a measure of NOx conversion in an SCR device and indicate a non-urea reductant fault based upon the measure of NOx conversion.

The above methods can be utilized to diagnose and indicate a non-urea reductant fault. However, it will be appreciated that certain normal operational conditions are required in order for the diagnosis to be made with high confidence. For example, low urea delivery line pressure or urea injector faults, situations that can prevent adequate replenishment of the reductant upon the catalyst, can create similar conditions within an SCR device as contamination in the urea storage tank. However, line pressure in the system feeding urea to the injector can be monitored, and injector faults such as full or partial clogging can be diagnosed by pressure measurements or other methods known in the art. A step can be added to above methods before a non-urea injector fault is either diagnosed or indicated to evaluate whether these normal operational conditions have been met in order to avoid false non-urea reductant faults.

Indication of a non-urea reductant fault can take many forms and can include such indications as a warning indicator to an operator as a light, a visible message, or an audible message; an indication logged in a controller of the powertrain; an indication to an engine controller to prefer operating modes producing less NOx; and a message over a wireless communication system to a remote processor or information network.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for indicating a non-urea reductant fault in a powertrain comprising an internal combustion engine and an aftertreatment system comprising an aftertreatment device utilizing a catalyst to convert NOx, said method comprising:
   monitoring a powertrain start-up event; and
   initiating a non-urea fault diagnostic based upon said powertrain start-up event, comprising:
      monitoring a NOx content exiting said aftertreatment system subsequent to said powertrain start-up event through a test span, said test span starting based upon said powertrain start-up event;
      monitoring a measure of NOx content entering said aftertreatment system through said test span;
      determining a measure of NOx conversion accomplished in said aftertreatment device based upon said NOx content exiting said aftertreatment system and said measure of NOx content entering said aftertreatment system;
      through said test span, comparing said measure of NOx conversion determined at a start of said test span to said measure of NOx conversion at a later time within said test span;
      identifying a NOx conversion fall off following said powertrain start-up event between said start of said test span and said later time within said test span based upon said comparing; and
      indicating a non-urea reductant fault based upon said NOx conversion fall off.

2. The method of claim 1, wherein said measure of NOx conversion accomplished in said aftertreatment device is a conversion efficiency; and wherein identifying said NOx conversion fall off comprises identifying a reduction in said conversion efficiency.

3. The method of claim 1, wherein said measure of NOx conversion accomplished in said aftertreatment device is a difference in said NOx content exiting said aftertreatment system as compared to a predicted NOx content exiting said aftertreatment system; and wherein said comparing identifying said reduction in NOx conversion accomplished in said aftertreatment device comprises identifying an increase in said difference.

4. Method for indicating a non-urea reductant fault in a powertrain comprising an internal combustion engine and an aftertreatment system comprising an aftertreatment device utilizing a catalyst to convert NOx, said method comprising:
   monitoring a NOx content exiting said aftertreatment system subsequent to a powertrain start-up event through a test span;
   monitoring a measure of NOx content entering said aftertreatment system subsequent to a powertrain start-up event through said test span;
   determining a difference in said NOx content exiting said aftertreatment system as compared to a predicted NOx content exiting said aftertreatment system based upon said NOx content exiting said aftertreatment system and said measure of NOx content entering said aftertreatment system;
   through said test span, comparing said difference determined at a start of said test span to said difference at a later time within said test span; and
   indicating a non-urea reductant fault based upon said comparing identifying a reduction in NOx conversion accomplished in said aftertreatment device between said start of said test span and said later time within said test span;
   wherein said comparing identifying said reduction in NOx conversion accomplished in said aftertreatment device comprises identifying an increase in said difference in said NOx content exiting said aftertreatment system as compared to said predicted NOx content exiting said aftertreatment system.

5. Method for indicating a non-urea reductant fault in a powertrain comprising an internal combustion engine and an aftertreatment system comprising an aftertreatment device utilizing a catalyst to convert NOx, said method comprising:
   monitoring a NOx content entering said aftertreatment system;
   monitoring a NOx content exiting said aftertreatment system;
   determining a conversion efficiency for a first window of a test period based upon said NOx content entering said aftertreatment system and said NOx content exiting said aftertreatment system;
   determining a conversion efficiency for a subsequent window of said test period based upon said NOx content entering said aftertreatment system and said NOx content exiting said aftertreatment system;
   comparing said conversion efficiency for said first window and said conversion efficiency for said subsequent window; and
   indicating said non-urea reductant fault based upon said comparing and a diagnostic threshold selected to indicate a significant drop in conversion efficiency between said first window and said subsequent window.

6. The method of claim 5, wherein said determining said conversion efficiency for said first window comprises:
   determining a fraction of NOx converted in said aftertreatment device as compared to said NOx content entering said aftertreatment system during said first window.

7. The method of claim 6, wherein said determining said fraction of NOx converted in said aftertreatment device as compared to said NOx content entering said aftertreatment system during said first window comprises:
   determining an average of said NOx content exiting said aftertreatment system during said first window;
   determining an average of said NOx content entering said aftertreatment system during said first window; and
   utilizing said averages to determine an average conversion efficiency for said first window.

8. The method of claim 6, wherein said determining said fraction of NOx converted in said aftertreatment device as compared to said NOx content entering said aftertreatment system during said first window comprises:
   determining an integral of said NOx content exiting said aftertreatment system during said first window;
   determining an integral of said NOx content entering said aftertreatment system during said first window; and
   utilizing said integrals to determine an average conversion efficiency for said first window.

9. The method of claim 5, wherein said determining said conversion efficiency for said subsequent window comprises:

determining a fraction of NOx converted in said aftertreatment device as compared to said NOx content entering said aftertreatment system during said subsequent window.

10. The method of claim 9, wherein said determining said fraction of NOx converted in said aftertreatment device as compared to said NOx content entering said aftertreatment system during said subsequent window comprises:
   determining an average of said NOx content exiting said aftertreatment system during said subsequent window;
   determining an average of said NOx content entering said aftertreatment system during said subsequent window; and
   utilizing said averages to determine an average conversion efficiency for said subsequent window.

11. The method of claim 9, wherein said determining said fraction of NOx converted in said aftertreatment device as compared to said NOx content entering said aftertreatment system during said subsequent window comprises:
   determining an integral of said NOx content exiting said aftertreatment system during said subsequent window;
   determining an integral of said NOx content entering said aftertreatment system during said subsequent window; and
   utilizing said integrals to determine an average conversion efficiency for said subsequent window.

12. The method of claim 5, wherein said comparing said conversion efficiency for said first window and said conversion efficiency for said subsequent window comprises:
   determining a first window conversion efficiency error based upon said conversion efficiency for said first window and a predicted conversion efficiency for said first window;
   determining a subsequent window conversion efficiency error based upon said conversion efficiency for said subsequent window and a predicted conversion efficiency for said subsequent window; and
   determining a ratio of said subsequent window conversion efficiency error to said first window conversion efficiency error.

13. The method of claim 12,
   wherein said diagnostic threshold is a calibrated threshold ratio; and
   wherein said indicating said non-urea reductant fault based upon said comparing and said diagnostic threshold comprises determining whether said ratio of said subsequent window conversion efficiency error to said first window conversion efficiency error exceeds said calibrated threshold ratio.

14. The method of claim 5, further comprising:
   determining a conversion efficiency for a plurality of subsequent windows of said test period based upon said NOx content entering said aftertreatment system and said NOx content exiting said aftertreatment system;
   comparing said conversion efficiency for said first window and said conversion efficiencies for said subsequent windows; and
   indicating said non-urea reductant fault based upon said comparing said conversion efficiency for said first window and said conversion efficiencies for said subsequent windows.

15. The method of claim 14, wherein said indicating said non-urea reductant fault based upon said comparing said conversion efficiency for said first window and said conversion efficiencies for said subsequent windows comprises:
   indicating said non-urea reductant fault based upon any of said conversion efficiencies for said subsequent windows violating said diagnostic threshold.

16. The method of claim 14, wherein said indicating said non-urea reductant fault based upon said comparing said conversion efficiency for said first window and said conversion efficiencies for said subsequent windows comprises:
   indicating said non-urea reductant fault based upon a plurality of said conversion efficiencies for said subsequent windows violating said diagnostic threshold.

17. The method of claim 5, wherein said monitoring said NOx content entering said aftertreatment system comprises:
   monitoring operation of said engine; and
   estimating NOx creation in said engine based upon said operation of said engine.

18. Method for generating a non-urea reductant fault in a powertrain comprising an internal combustion engine and an aftertreatment system comprising an aftertreatment device utilizing a catalyst to convert NOx into nonpolluting molecules, said method comprising:
   monitoring a urea storage tank refill event;
   monitoring a NOx content entering said aftertreatment system;
   monitoring a NOx content exiting said aftertreatment system;
   upon occurrence of said urea storage tank refill event, determining a baseline conversion efficiency for a first window of a test period based upon said NOx content entering said aftertreatment system and said NOx content exiting said aftertreatment system;
   determining conversion efficiencies for a series of subsequent windows of said test period based upon said NOx content entering said aftertreatment system and said NOx content exiting said aftertreatment system;
   converting said conversion efficiencies to conversion efficiency errors based upon a predicted conversion efficiency for each window;
   determining a ratio for each conversion efficiency error for each subsequent window to said conversion efficiency error for said first window;
   comparing said ratio for each subsequent window to a calibrated threshold ratio selected to indicate a significant drop in conversion efficiency between said first window and said subsequent window; and
   generating said non-urea reductant fault based upon said comparing.

19. Apparatus for indicating a non-urea reductant fault in a powertrain comprising an internal combustion engine and an aftertreatment system comprising an aftertreatment device utilizing a catalyst to convert NOx, said apparatus comprising:
   a sensor monitoring NOx content exiting said aftertreatment system;
   an SCR conversion efficiency module, including programming to:
   monitor a NOx content entering said aftertreatment system;
   monitor a NOx content exiting said aftertreatment system;
   determine a conversion efficiency for a first window of said test period based upon said NOx content entering said aftertreatment system and said NOx content exiting said aftertreatment system;
   determine a conversion efficiency for a subsequent window of a test period based upon said NOx content entering said aftertreatment system and said NOx content exiting said aftertreatment system;

compare said conversion efficiency for said first window and said conversion efficiency for said subsequent window; and indicate said non-urea reductant fault based upon said comparing and a diagnostic threshold selected to indicate a significant drop in conversion efficiency between said first window and said subsequent window.

20. The apparatus of claim 19, wherein said programming to determine said conversion efficiency for said first window comprises
programming to determine a fraction of NOx converted in said aftertreatment device as compared to said NOx content entering said aftertreatment system during said first window; and wherein said programming to determine said conversion efficiency for said subsequent window comprises
programming to determine a fraction of NOx converted in said aftertreatment device as compared to said NOx content entering said aftertreatment system during said subsequent window.

21. The apparatus of claim 19, wherein said programming to compare said conversion efficiency for said first window and said conversion efficiency for said subsequent window comprises programming to:

determine a first window conversion efficiency error based upon said conversion efficiency for said first window and a predicted conversion efficiency for said first window;

determine a subsequent window conversion efficiency error based upon said conversion efficiency for said subsequent window and a predicted conversion efficiency for said subsequent window; and determine a ratio of said subsequent window conversion efficiency error to said first window conversion efficiency error.

22. The apparatus of claim 21, wherein said diagnostic threshold is a calibrated threshold ratio; and wherein said programming to indicate said non-urea reductant fault based upon said comparing and said diagnostic threshold comprises programming to determine whether said ratio of said subsequent window conversion efficiency error to said first window conversion efficiency error exceeds said calibrated threshold ratio.

* * * * *